(12) United States Patent
Cha et al.

(10) Patent No.: US 9,607,257 B2
(45) Date of Patent: Mar. 28, 2017

(54) ELECTRONIC DEVICE AND METHOD FOR TRANSMITTING INFORMATION ON BARCODE BY USING INFRARED LED

(71) Applicant: Samsung Electronics Co. Ltd., Suwon-si, Gyeonggi-do (KR)

(72) Inventors: Do-Hun Cha, Yongin-si (KR); Ju-Nyun Kim, Yongin-si (KR); Jun-Hui Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 13/927,615

(22) Filed: Jun. 26, 2013

(65) Prior Publication Data

US 2014/0054381 A1 Feb. 27, 2014

(30) Foreign Application Priority Data

Aug. 24, 2012 (KR) .......................... 10-2012-0093168

(51) Int. Cl.
*G06K 7/10* (2006.01)
*G06K 19/06* (2006.01)

(52) U.S. Cl.
CPC .............................. *G06K 19/06112* (2013.01)

(58) Field of Classification Search
USPC ......................................... 235/462.01–462.49
See application file for complete search history.

(56) References Cited

U.S. PATENT DOCUMENTS

| | | | | |
|---|---|---|---|---|
| 5,097,283 A | * | 3/1992 | Kazumi | ........................ 396/213 |
| 5,192,856 A | * | 3/1993 | Schaham | ................. 235/462.24 |
| 2008/0232780 A1 | * | 9/2008 | Yamada | ........................ 386/117 |
| 2012/0147867 A1 | | 6/2012 | Kale et al. | |

FOREIGN PATENT DOCUMENTS

| | | |
|---|---|---|
| JP | 5-120464 A | 5/1993 |
| JP | 6-187475 A | 7/1994 |

* cited by examiner

*Primary Examiner* — Jamara Franklin
(74) *Attorney, Agent, or Firm* — Jefferson IP Law, LLP

(57) ABSTRACT

An electronic device and method for transmitting information on a barcode by using an infrared Light Emitting Diode (LED) are provided. The method includes transforming a displayed barcode into a binary code, and lighting ON/OFF an infrared LED according to set order based on the binary code.

17 Claims, 10 Drawing Sheets

ELECTRONIC DEVICE AND METHOD FOR TRANSMITTING INFORMATION ON BARCODE BY USING INFRARED LED

PRIORITY

This application claims the benefit under 35 U.S.C. §119(a) of a Korean patent application filed on Aug. 24, 2012 in the Korean Intellectual Property Office and assigned Serial No. 10-2012-0093168, the entire disclosure of which is hereby incorporated by reference.

BACKGROUND OF THE INVENTION

1. Field of the Invention

The present invention relates to an electronic device and method for transmitting information on a barcode. More particularly, the present invention relates to an electronic device and method for transmitting information on a barcode using an infrared Light Emitting Diode (LED).

2. Description of the Related Art

The field of mobile commerce in which a user can conduct several types of commercial transactions with a single electronic device is growing very rapidly. At present, the services and/or functions with which the mobile commerce using the electronic device may be used are widely expanding. For example, mobile commerce is expanding into applications associated with entertainment, message delivery, information provision, banking, ticketing, and the like. For example, the user can install an application capable of recognizing a barcode in the electronic device so as to allow an electronic device configured with a camera to recognize a barcode printed on a product of interest and thereafter load data of an on-line market to search for the lowest price from the data of the on-line market. Further, the electronic device configured with a camera may be used to recognize a barcode included on a business card. Using the electronic device configured with a camera to recognize a barcode included in a business card with the electronic device may be advantageous from the perspective that a user would not be required to manually register a contact in the address book of the electronic device or to otherwise contact the contact.

However, a disadvantage with an electronic device according to the related art is that a barcode reader is generally unable to accurately recognize a barcode displayed in the electronic device. Specifically, when the barcode reader reads information on the barcode displayed in the electronic device, a recognition rate of recognizing the information on the barcode is deteriorated noticeably because a laser generated in the barcode reader is diffusely reflected from a Liquid Crystal Display (LCD) screen of the electronic device.

Accordingly, the development of a way to improve a recognition rate of a barcode essentially used in the rapidly growing mobile commerce market is urgently needed.

Therefore, a need exists for an electronic device and method capable of remarkably reducing an erroneous recognition rate of information on a barcode by allowing a barcode reader to scan an infrared light emitting diode.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an electronic device and method capable of increasing a recognition rate of information on a barcode in a barcode reader by lighting ON/OFF an infrared Light Emitting Diode (LED) according to set order.

Another aspect of the present invention is to provide an electronic device and method capable of remarkably reducing an erroneous recognition rate of information on a barcode by allowing a barcode reader to scan an infrared LED.

A further aspect of the present invention is to provide an electronic device and method in which a user can lead a barcode reader to scan an infrared LED by lighting ON/OFF a service LED.

Aspects of the present invention may be achieved by providing an electronic device and method for transmitting information on a barcode by using an infrared LED.

In accordance with an aspect of the present invention, an operation method of an electronic device for transmitting information on a barcode by using an infrared LED is provided. The method includes transforming a displayed barcode into a binary code, and lighting ON/OFF an infrared LED according to a set order based on the binary code.

In accordance with another aspect of the present invention, the operation method of an electronic device for transmitting information on a barcode by using an infrared LED may include displaying any content including the barcode.

In accordance with another aspect of the present invention, the transforming of the displayed barcode into the binary code may include recognizing the displayed barcode, and transforming the recognized barcode in a form of a combination of at least eight digits of '0' or '1'.

In accordance with another aspect of the present invention, the method of an electronic device for transmitting information on a barcode by using an infrared LED may include storing the transformed binary code.

In accordance with another aspect of the present invention, the lighting ON/OFF of the infrared LED according to the set order based on the binary code may include starting to light ON/OFF a service LED, determining whether the barcode reader is scanning the infrared LED, and starting to light ON/OFF the infrared LED.

In accordance with another aspect of the present invention, the method of an electronic device for transmitting information on a barcode by using an infrared LED may include displaying a guide message instructing the barcode reader to approach the service LED.

In accordance with another aspect of the present invention, the determining of whether the barcode reader is scanning the infrared LED may include determining whether the barcode reader is scanning the infrared LED by using a sensor located within a set distance from the infrared LED.

In accordance with another aspect of the present invention, the starting to light ON/OFF the infrared LED may include detecting binary code elements corresponding to the binary code in regular sequence according to arranged order of the binary code and, if the detected any one binary code element is determined to correspond to a digit of '0', lighting OFF the infrared LED during a corresponding set time.

In accordance with another aspect of the present invention, the starting to light ON/OFF the infrared LED may include detecting binary code elements corresponding to the binary code in regular sequence according to arranged order of the binary code and, if the detected any one binary code element is determined to correspond to a digit of '1', lighting ON the infrared LED during a corresponding set time.

In accordance with another aspect of the present invention, the sensor may include at least one of a gesture sensor and a proximity sensor.

In accordance with another aspect of the present invention, an electronic device for transmitting information on a barcode by using an infrared LED is provided. The device includes an application module and the infrared LED. The application module transforms a displayed barcode into a binary code. The infrared LED lights ON/OFF according to set order based on the binary code.

In accordance with another aspect of the present invention, the device may include a touch screen for displaying any content including the barcode.

In accordance with another aspect of the present invention, the application module may recognize the displayed barcode, and transform the recognized barcode in a form of a combination of at least eight digits of '0' or '1'.

In accordance with another aspect of the present invention, the device may include a memory for storing the transformed binary code.

In accordance with another aspect of the present invention, the device may include a service LED and a sensor. The service LED starts to light ON/OFF. The sensor determines whether the barcode reader is scanning the infrared LED. The infrared LED starts to light ON/OFF.

In accordance with another aspect of the present invention, the device may include a touch screen for displaying a guide message instructing the barcode reader to approach the service LED.

In accordance with another aspect of the present invention, the sensor may determine whether the barcode reader is located within a set distance from the infrared LED and whether the barcode reader is scanning the infrared LED.

In accordance with another aspect of the present invention, the device may include a processor unit. The processor unit detects binary code elements corresponding to the binary code in regular sequence according to arranged order of the binary code. If the detected any one binary code element is determined to correspond to a digit of '0', the processor unit lights OFF the infrared LED during a corresponding set time.

In accordance with another aspect of the present invention, the device may include a processor unit. The processor unit detects binary code elements corresponding to the binary code in regular sequence according to arranged order of the binary code. If the detected any one binary code element is determined to correspond to a digit of '1', the processor unit lights ON the infrared LED during a corresponding set time.

In accordance with another aspect of the present invention, the sensor may include at least one of a gesture sensor and a proximity sensor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will become more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, the electronic device can display any one content among at least one content stored in the electronic device on a touch screen of the electronic device. The electronic device can display content, which is downloaded from any server or are photographed by a camera provided in the electronic device, on the touch screen of the electronic device. Thereafter, the electronic device can conduct a mobile commerce function by using the content displayed on the touch screen.

According to exemplary embodiments of the present invention, the electronic device can recognize a barcode included in the content to easily conduct the mobile commerce function anytime, anywhere. For example, according to exemplary embodiments of the present invention, the electronic device can photograph a barcode printed on a specific product with the camera provided in the electronic device and thereafter the electronic device can access a server of an on-line market to receive data such as price terms of the specific product, and the like from the on-line market server.

According to exemplary embodiments of the present invention, the electronic device may recognize a barcode displayed at the end of news of a newspaper, a magazine or the like, and may receive multimedia content related to the news from a server of a corresponding publishing company.

Figure 1:
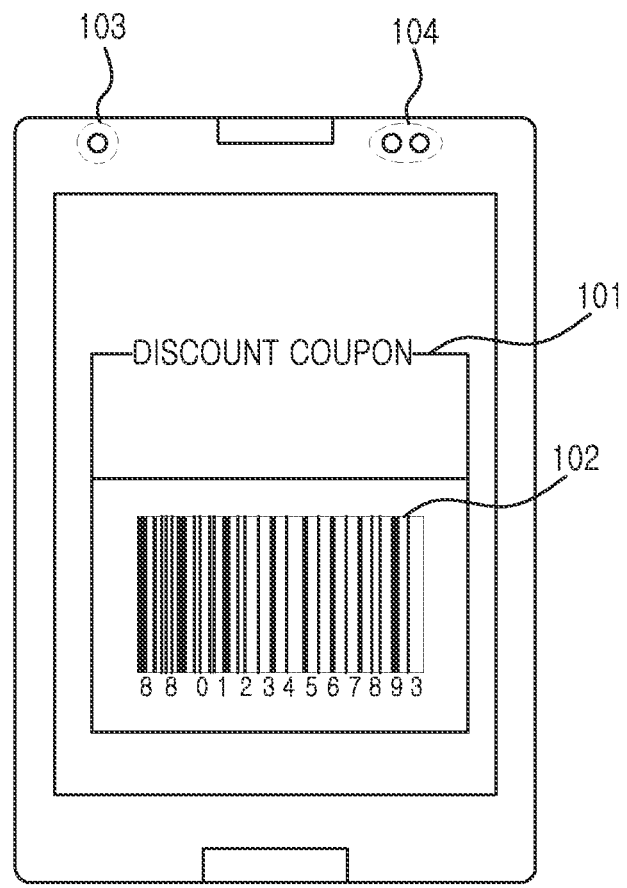
FIG. 1 is a diagram for describing an electronic device transmitting information on a barcode by using an infrared Light Emitting Diode (LED) according to an exemplary embodiment of the present invention.

FIG. 1 is a diagram for describing an electronic device transmitting information on a barcode by using an infrared Light Emitting Diode (LED) according to an exemplary embodiment of the present invention.

Referring to FIG. 1, an electronic device displays a discount coupon 101 stored in the electronic device, on a touch screen of the electronic device. In detail, the discount coupon 101 includes a barcode 102 including information on the discount coupon 101. For example, after finishing a meal in a restaurant 'A', a user can display a discount coupon capable of discounting a menu of the restaurant 'A', stored in the electronic device, on the touch screen of the electronic device. The electronic device can display the discount coupon 101 capable of discounting the menu of the restaurant 'A'. As illustrated in FIG. 1, the discount coupon 101 can be displayed together with the barcode 102 including the information on the discount coupon 101.

Thereafter, the electronic device can transform the barcode 102 displayed on the touch screen of the electronic device, into a binary code. In detail, the electronic device can recognize the barcode 102 displayed on the touch screen of the electronic device and then, transform the recognized barcode 102 in a form of a combination of at least eight digits of '0' or '1'. For example, digits marked under the barcode 102 can be subdivided into a country code, a manufacturer code, a self-product code, a verification code, and the like. The country code can be comprised of three codes, the manufacturer code can be comprised of minimum three codes, and the self-product code and the verification code can be comprised of minimum one code, respectively. Accordingly, because a barcode can be comprised of at least eight codes, the electronic device can transform the barcode capable of being comprised of the at least eight codes, in a form of a combination of at least eight digits of '0' or '1'. Because the barcode 102 illustrated in FIG. 1 is comprised of a total of thirteen codes, the electronic device can transform the thirteen codes into a total of thirteen binary codes that is a combination of digits of '0' or '1'. Thereafter, the electronic device can store the thirteen binary codes and then, light ON/OFF (e.g., control or switch a light between an on state and an off state) a service LED 103 according to the stored thirteen binary codes.

The service LED 103 may correspond to a diode lighting ON/OFF (e.g., switching between an on state and an off state, or blinking) when there is an operation of the electronic device or when the electronic device has an unchecked message and when content including a barcode are displayed on the touch screen of the electronic device. When the electronic device is being charged, the service LED 103 provided in the electronic device can emit a 1st color when the charging is not completed. When the charging is completed, the service LED 103 can emit a 2nd color. When the electronic device has an unchecked message, the service LED 103 can light ON/OFF a 3rd color. If the electronic device determines that the content including the barcode are displayed on the touch screen of the electronic device, the service LED 103 can light ON/OFF a 4th color. For example, if the electronic device is being charged and the electronic device has not been completely charged, then the service LED 103 can emit red, and if the electronic device has been completely charged, then the service LED 103 can emit green. Further, if the electronic device has an unchecked message, the service LED 103 can light ON/OFF yellow. If the content including the barcode are displayed on the touch screen of the electronic device, then the service LED 103 can light ON/OFF blue.

According to exemplary embodiments of the present invention, the service LED 103 lights ON/OFF in a set color to lead a barcode reader to approach an infrared LED 104 (e.g., so as to help facilitate a barcode reader to accurately read the barcode). The service LED 103 lights ON/OFF in order to lead the barcode reader to scan the infrared LED 104 that is located on the same horizontal axis as the service LED 103. For example, because infrared rays lighted ON/OFF in the infrared LED 104 are invisible to the naked eye, the service LED 103 lights ON/OFF in a set color such that a user who uses the barcode reader can scan the infrared LED 104 with the barcode reader.

The infrared LED 104 can light ON/OFF according to a set order such that the barcode reader can recognize binary codes transformed in the electronic device. Specifically, the infrared LED 104 can light ON/OFF infrared rays according to arrangement order of binary codes detected in the electronic device. For example, if any one binary code detected in the electronic device is determined to correspond to a digit of '0', the infrared LED 104 can light OFF the infrared rays during a set time. In contrast, if any one binary code detected in the electronic device is determined to correspond to a digit of '1', the infrared LED 104 can light ON the infrared rays during the set time.

For example, assuming that the binary codes detected in the electronic device are equal to "01010101", the infrared LED 104 repeats a process of lighting OFF and ON the infrared rays four times during the set time. As another example, assuming that the binary codes detected in the electronic device are equal to "11011011", the infrared LED 104 repeats a process of lighting ON, ON, OFF, ON, ON, OFF, ON, and ON the infrared rays during the set time. Accordingly, the barcode reader can scan information on the barcode transformed into the binary code by using infrared rays emitted from the infrared LED 104.

An electronic device according to the related art has a problem associated with a barcode reader failing to accurately recognize a barcode displayed in an electronic device. Specifically, when the barcode reader reads information on the barcode displayed on the electronic device according to the related art, a laser generated in the barcode reader is diffusely reflected from a screen (e.g., a Liquid Crystal Display (LCD)) of the electronic device and thus, remarkably deteriorates a recognition rate of recognizing the information on the barcode. However, the electronic device according to exemplary embodiments of the present invention has an advantage of leading the barcode reader to scan a region including the infrared LED 104 instead of just scanning the barcode displayed on the touch screen of the electronic device, thereby improving the recognition rate of the barcode reader.

Figure 2A:
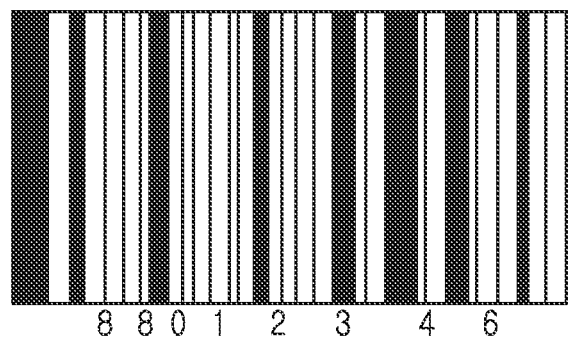
FIGS. 2A to 2B are diagrams illustrating a barcode transformed into a binary code according to an exemplary embodiment of the present invention.
Figure 2B:
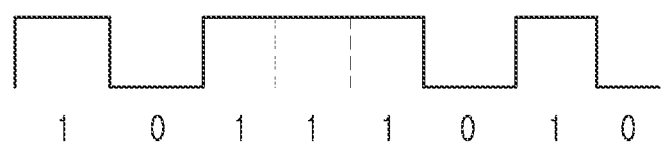

FIGS. 2A and 2B are diagrams illustrating a barcode transformed into a binary code according to an exemplary embodiment of the present invention.

Referring to FIG. 2A, a diagram of a barcode comprised of eight codes is provided. First, an electronic device can display any content including the barcode on a touch screen of the electronic device. The barcode including information of the content can be displayed together with the content displayed on the touch screen of the electronic device.

As illustrated in FIG. 2A, the barcode can be comprised of at least eight codes. Digits marked under the barcode can be mainly subdivided into a country code, a manufacturer code, a self-product code, and a verification code. The country code can be comprised of three codes, the manufacturer code can be comprised of minimum three codes, and the self-product code and the verification code can be comprised of minimum one code, respectively. For example, among a total of eight codes, "880" denotes the country code, "123" denotes the manufacturer code, "4" denotes the self-product code, and "6" denotes the verification code. Accordingly, the electronic device can display a barcode comprised of at least eight codes together with any content including the barcode, on the touch screen of the electronic device.

Referring to FIG. 2B, a diagram of transforming a barcode into a binary code in an electronic device is provided.

When a barcode is included in content displayed on a touch screen of the electronic device (e.g., if the electronic device determines that a barcode is included in the content displayed on the touch screen), the electronic device can transform the barcode displayed on the touch screen into a binary code. The electronic device can recognize the barcode displayed on the touch screen. Thereafter, the electronic device may transform the recognized barcode in a form of a combination of at least eight digits of '0' or '1'. For example, among the barcode displayed on the touch screen of the electronic device, three country codes "880" can be transformed into binary codes of "101", respectively, and manufacturer codes "123" can be transformed into binary codes of "110", respectively. The one self-product code "4" can be transformed into a binary code of "1", and the one verification code "6" can be transformed into a binary code of "0". Accordingly, because the barcode can be comprised of at least eight codes, the electronic device can transform the barcode capable of being comprised of the at least eight codes, in a form of a combination of at least eight digits of '0' or '1'. FIG. 2B illustrates an exemplary embodiment of transforming a barcode of "88012346" into a total of eight binary codes of "10111010".

Figure 3:
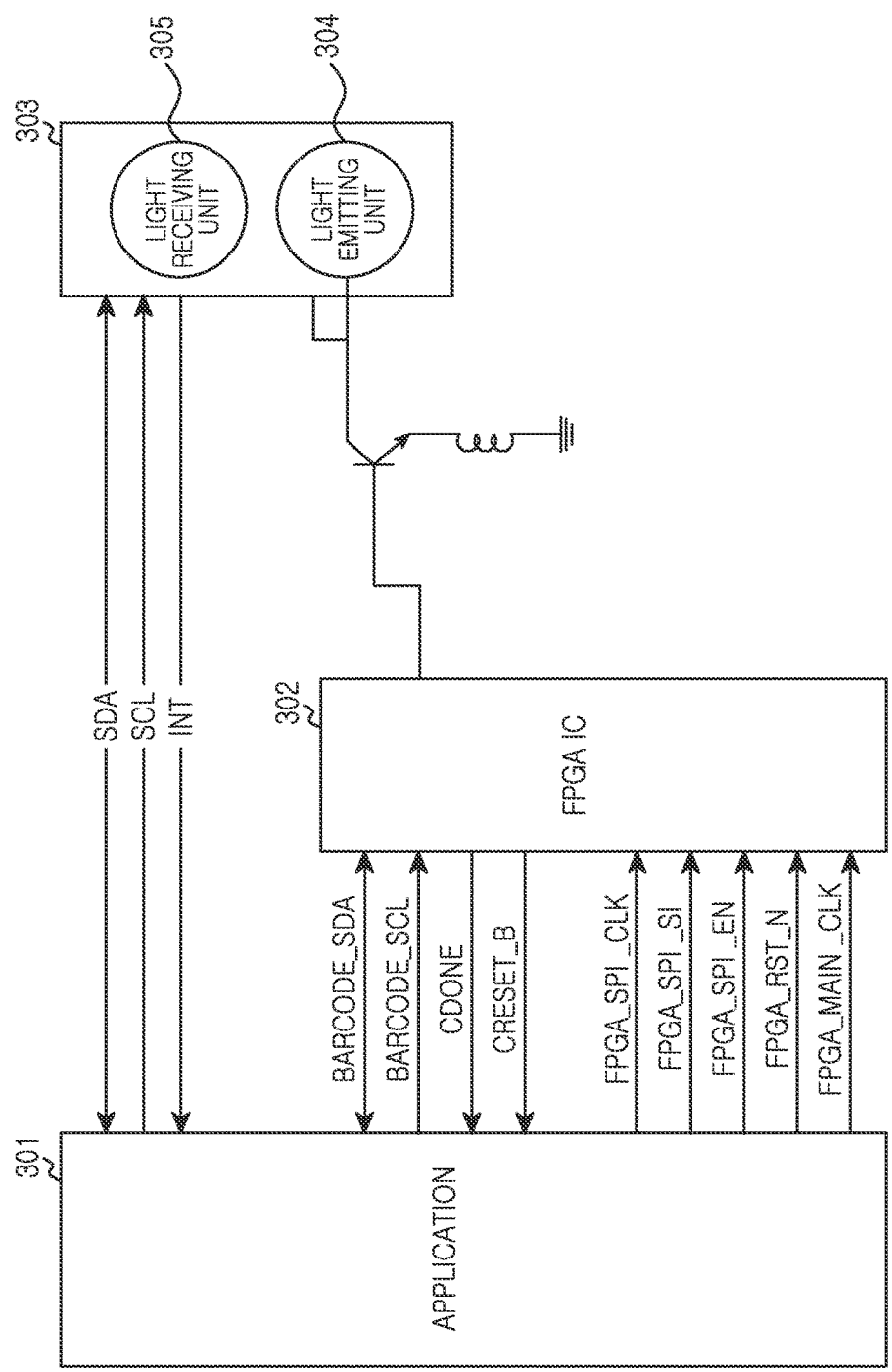
FIG. 3 is a block diagram illustrating a relationship of an application, a Field Programmable Gate Array Integrated Circuit (FPGA IC), and an infrared LED according to an exemplary embodiment of the present invention.

FIG. 3 is a block diagram illustrating a relationship of an application, a Field Programmable Gate Array Integrated Circuit (FPGA IC), and an infrared LED according to an exemplary embodiment of the present invention.

Referring to FIG. 3, the electronic device can include an application 301, an FPGA IC 302, and an infrared LED 303.

The application 301 reads information of a barcode. The application 301 can read information of a barcode displayed on a touch screen of the electronic device. After reading information of a barcode displayed on the touch screen of the electronic device, the application 301 forwards the read information on the barcode to the FPGA IC 302.

The FPGA IC 302 is a chip composed of millions of transistor arrays. The FPGA IC 302 may correspond to an IC capable of, unlike widely used Application Specific Integrated Circuits (ASIC), manufacturing user's desiring hardware as a Register Transistor Logic (RTL) in Very High Speed Integrated Circuit (VHSIC) Hardware Description Language (VHDL) or Verilog language and directly programming a function of a hardware chip itself to make a chip and capable of updating hardware like firmware. According to exemplary embodiments of the present invention, the FPGA IC 302 plays receives information on a barcode from the application 301 and forwards the received information on the barcode to a light emitting unit 304 of the infrared LED 303. For example, 'Barcode_SDA' and 'Barcode_SCL' illustrated in FIG. 3 denote interfaces for enabling the application 301 to control the FPGA IC 302 between the application 301 and the FPGA IC 302. 'CDONE' denotes an ending signal that is enabled when a code downloaded to the FPGA IC 302 has been completely downloaded. 'CRESET_B' denotes a signal used for, when a problem exists in the downloaded code within the FPGA IC 302, resetting the problematic code. 'FPGA_SPI_CLK', 'FPGA_SPI_SI', and 'FPGA_SPI_EN' denote interfaces capable of downloading the code of the FPGA IC 302. 'FPGA_RST_N' and 'FPGA_MAIN_CLK' respectively denote a reset signal and a chip main clock.

According to exemplary embodiments of the present invention, the infrared LED 303 may include the light emitting unit 304 which is configured to emit infrared rays and a light receiving unit 305 which is configured to receive the infrared rays reflected from an object. The LED 304 of the infrared LED 303 can receive information on a barcode from the FPGA IC 302, in order for the infrared LED 303 to light ON/OFF infrared rays dependent on the received information on the barcode according to set order. 'SDA' and 'SCL' denote clock signals corresponding to a clock of data of an Intermediate Frequency (IF) between the application 301 and the infrared LED 303. 'SDA' and 'SCL' signals are used to control an interface for various settings of a sensor and an operation thereof. For example, the 'SDA' and 'SCL' signals are used for basic control when controlling the sensor and the infrared LED by using the FPGA IC 302. 'INT' denotes an interrupt signal. 'INT' is used for, when a problem is caused by the sensor, informing the application 301 of such a problem.

Figure 4:
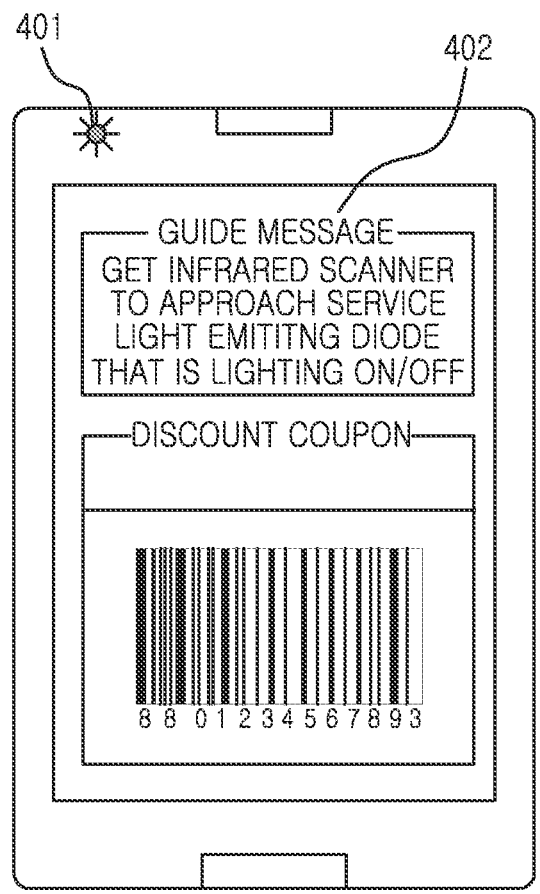
FIG. 4 is a diagram illustrating lighting ON/OFF a service LED while displaying a guide message on a touch screen of an electronic device according to an exemplary embodiment of the present invention.

FIG. 4 is a diagram illustrating lighting ON/OFF a service LED while displaying a guide message on a touch screen of an electronic device according to an exemplary embodiment of the present invention.

Referring to FIG. 4, the electronic device can light ON/OFF the service LED 401. If a barcode displayed on the touch screen of the electronic device has been transformed into a binary code (e.g., if the electronic device determines that the barcode displayed on the touch screen has been transformed into a binary code), then the electronic device stores the transformed binary code and thereafter lights ON/OFF the service LED 401. The service LED 401 can be defined as a diode lighting ON/OFF when there is an operation of the electronic device or when the electronic device has an unchecked message and when content including a barcode are displayed on the touch screen of the electronic device. When the electronic device is being charged, the service LED 401 provided in the electronic device can emit a 1st color if the charging is not completed. The service LED 401 can emit a 2nd color when the charging is completed. When the electronic device has an unchecked message, the service LED 401 can light ON/OFF a 3rd color. If the content including the barcode are displayed on the touch screen of the electronic device, the service LED 401 can light ON/OFF a 4th color.

For example, if the electronic device has not been completely charged, the electronic device can emit red and, if the electronic device has been completely charged, the electronic device can emit green. If the electronic device has an unchecked message, the electronic device can light ON/OFF yellow and, if the content including the barcode are displayed on the touch screen of the electronic device, the electronic device can light ON/OFF blue.

The electronic device can light ON/OFF the service LED 401 and concurrently, display a guide message 402 on the touch screen of the electronic device. In order to lead a barcode reader to approach an infrared LED, the electronic device can display the guide message 402 on the touch screen, together. According to exemplary embodiments of the present invention, the electronic device lights ON/OFF the service LED 401 in a set color is to lead the barcode reader to approach the infrared LED. The service LED 401 lights ON/OFF in order to lead the barcode reader to scan the infrared LED that is located on the same horizontal axis as the service LED 401. Because infrared rays lighted ON/OFF in the infrared LED are invisible to the naked eye, the service LED 401 lights ON/OFF in a set color such that a user who uses the barcode reader can scan the infrared LED with the barcode reader.

Figure 5:
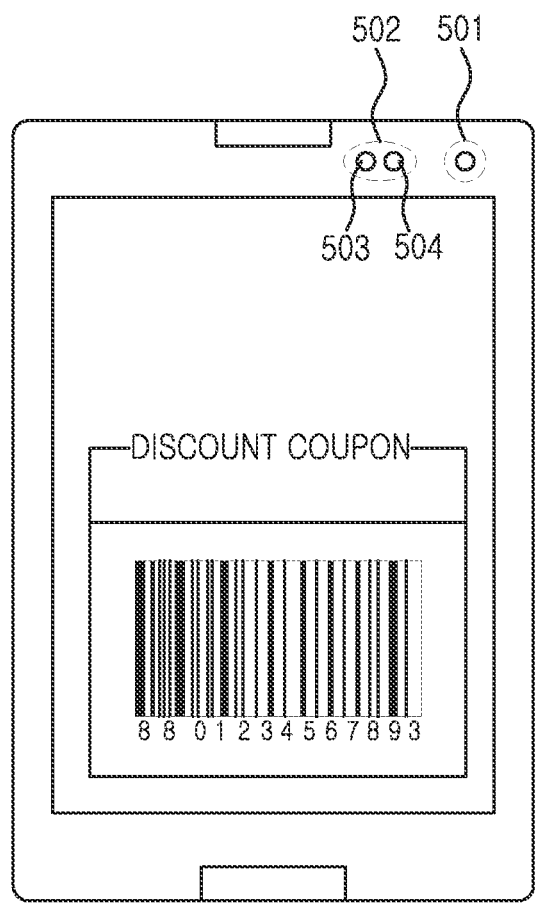
FIG. 5 is a diagram illustrating a relationship of an infrared LED and a sensor according to an exemplary embodiment of the present invention.

FIG. 5 is a diagram illustrating the relationship of an infrared LED and a sensor according to an exemplary embodiment of the present invention.

Referring to FIG. 5, an electronic device can include a sensor 501 and an infrared LED 502. The sensor 501 may be constructed to be isolated from the infrared LED 502 or may be constructed to include the infrared LED 502. As illustrated in FIG. 5, the sensor 501 may be constructed to be spaced a predetermined distance apart from the infrared LED 502 or may be constructed such that the infrared LED 502 is included within the sensor 501.

The sensor 501 can be a gesture sensor or a proximity sensor. The sensor 501 can determine whether a barcode reader is located within a set (e.g., predefined) distance. For example, the gesture sensor or the proximity sensor can determine whether the barcode reader has approached the electronic device (e.g., the sensor 501 or the infrared LED 502) within the set distance. For example, a minimum distance within which the gesture sensor or the proximity sensor can sense may be set to be a minimum distance within which the barcode reader can scan the infrared LED 502.

As described above, if the sensor 501 detects that the barcode reader is located within the set distance, the electronic device can light ON/OFF the infrared LED 502 according to set order such that the barcode reader can recognize a binary code. In detail, the infrared LED 502 can be composed of a light emitting unit 503 which is configured to emit infrared rays and a light receiving unit 504 which is configured to receive the infrared rays reflected from an object. The infrared LED 502 can be defined as a device lighting ON/OFF infrared rays according to set order such that the barcode reader can recognize the binary code transformed in the electronic device. The infrared LED 502 can light ON/OFF infrared rays according to arrangement order of binary codes detected in the electronic device. For example, if any one binary code detected in the electronic device is determined to correspond to a digit of '0', then the infrared LED 502 can light OFF the infrared rays during a set time. If any one binary code detected in the electronic device is determined to correspond to a digit of '1', the infrared LED 502 can light ON the infrared rays during the set time. For example, assuming that the binary codes detected in the electronic device are equal to "10101010", the infrared LED 502 repeats a process of lighting ON and OFF the infrared rays four times during the set time. As another example, assuming that the binary codes detected in the electronic device are equal to "00101100", the infrared LED 502 repeats a process of lighting OFF, OFF, ON, OFF, ON, ON, OFF, and OFF the infrared rays during the set time.

According to the related art, an electronic device displays a barcode on a touch screen, and a barcode reader directly scans the barcode displayed on the touch screen of the electronic device. However, according to the related art, a barcode reader is not able to accurately recognize the barcode displayed in the electronic device because infrared rays generated in the barcode reader are diffusely reflected from an LCD screen of the electronic device. In contrast, according to exemplary embodiments of the present invention, the barcode displayed on the touch screen may be transformed (e.g., configured or converted) into the binary code and the electronic device may, according to a set order, light ON/OFF the infrared rays dependent on the binary code transformed in the infrared LED 502. Accordingly, the electronic device according to exemplary embodiments of the present invention provides a solution to the problems associated with electronic devices according to the related art in which the barcode reader cannot recognize the barcode displayed in the electronic device because the infrared rays generated in the barcode reader are diffusely reflected from the LCD screen of the electronic device. The electronic device according to exemplary embodiments of the present invention may remarkably reduce an erroneous recognition rate of the barcode reader relative to the electronic device according to the related art, by transforming the barcode displayed in the electronic device into the binary code and lighting ON/OFF the infrared rays dependent on information on the barcode by means of the infrared LED 502.

Figure 6:
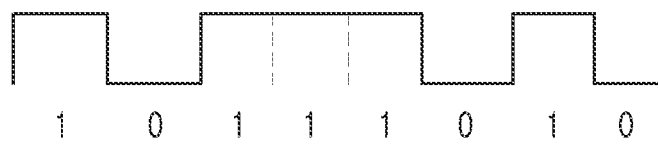
FIG. 6 is a diagram illustrating an order of lighting ON/OFF an infrared LED according to stored binary codes according to an exemplary embodiment of the present invention.

FIG. 6 is a diagram illustrating an order of lighting ON/OFF an infrared LED according to stored binary codes according to an exemplary embodiment of the present invention.

Referring to FIG. 6, if content displayed on a touch screen of an electronic device includes a barcode (e.g., if the electronic device determines that the content displayed on the touchscreen includes a barcode), the electronic device can transform the barcode displayed on the touch screen, into a binary code. The electronic device can recognize the barcode displayed on the touch screen and thereafter transform the recognized barcode in a form of a combination of at least eight digits of '0' or '1'. For example, among the barcode displayed on the touch screen of the electronic device, three country codes can be transformed into binary codes of "101", respectively, and manufacturer codes can be transformed into binary codes of "110", respectively. Also, one self product code can be transformed into a binary code of "1", and one verification code can be transformed into a binary code of "0". Accordingly, because the barcode can be comprised of at least eight codes, the electronic device can transform the barcode capable of being comprised of the at least eight codes, in a form of a combination of at least eight digits of '0' or '1'. FIG. 6 illustrates an exemplary embodiment of transforming any barcode into a total of eight binary codes of "10111010".

After the barcode is transformed into a combination of corresponding binary digits, the infrared LED can light ON/OFF infrared rays according to arrangement order of the binary codes detected in the electronic device. For example, if any one binary code detected in the electronic device is determined to correspond to a digit of '0', the infrared LED can light OFF the infrared rays during a set time. If any one binary code detected in the electronic device is determined to correspond to a digit of '1', the infrared LED can light ON the infrared rays during the set time. For example, if the binary codes detected in the electronic device are determined to equal to "10111010" as illustrated in FIG. 6, the infrared LED repeats a process of lighting ON, OFF, ON, ON, ON, OFF, ON, and OFF the infrared rays during the set time.

Figure 7:
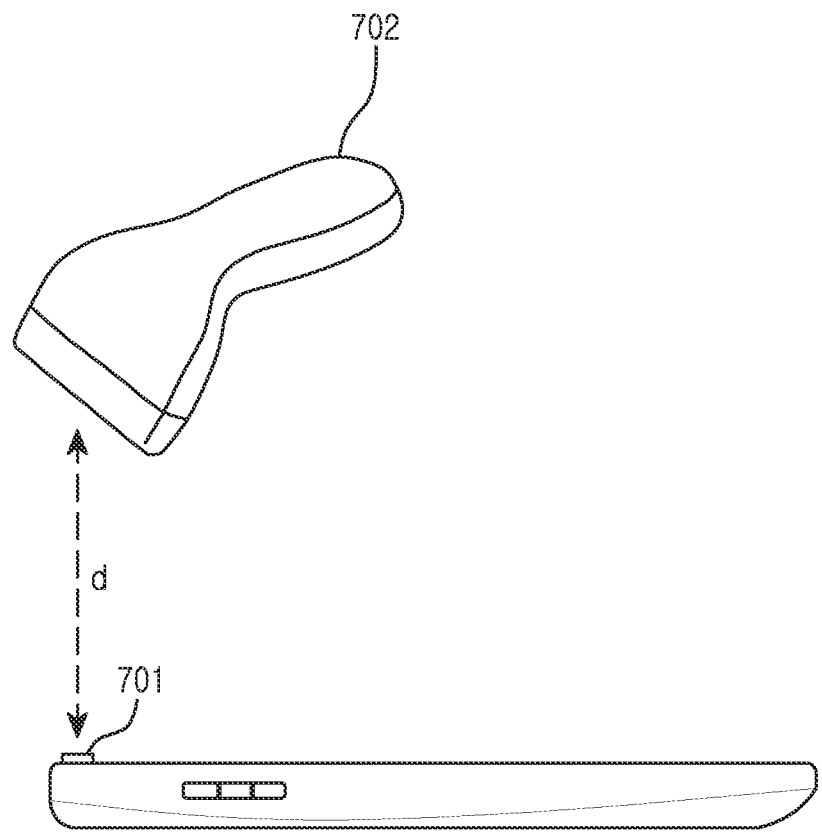
FIG. 7 is a diagram illustrating a sensing of a barcode reader in a sensor according to an exemplary embodiment of the present invention.

FIG. 7 is a diagram illustrating a sensing of a barcode reader in a sensor according to an exemplary embodiment of the present invention.

Referring to FIG. 7, the sensor 701 may be constructed to be isolated out of the infrared LED or may be constructed to include the infrared LED. The sensor 701 may be a gesture sensor, a proximity sensor, and/or the like. The sensor 701 can determine whether a barcode reader 702 is located within a set distance. For example, the gesture sensor or the proximity sensor can determine whether the barcode reader 702 has approached the electronic device within the set distance. For example, a minimum distance within which the gesture sensor or the proximity sensor can sense may be set to be a minimum distance within which the barcode reader 702 can scan the infrared LED.

First, if content displayed on a touch screen of an electronic device includes a barcode (e.g., if the electronic device determines that the content displayed on the touch screen includes a barcode), then the electronic device can transform the barcode displayed on the touch screen, into a binary code. The electronic device can recognize the barcode displayed on the touch screen and thereafter transform the recognized barcode in a form of a combination of at least eight digits of '0' or '1'. Thereafter, the electronic device can light ON/OFF a service LED and concurrently display a guide message of leading a barcode reader to approach the service LED on the touch screen. After lighting ON/OFF the service LED, the electronic device can sense whether the barcode reader 702 has approached within a set distance (d) by means of the sensor 701. If the sensor 701 senses (e.g., detects) that the barcode reader 702 has approached within the set distance (d), then the electronic device can light ON/OFF infrared rays dependent on information on the binary code according to set order by means of the infrared LED.

Figure 8:
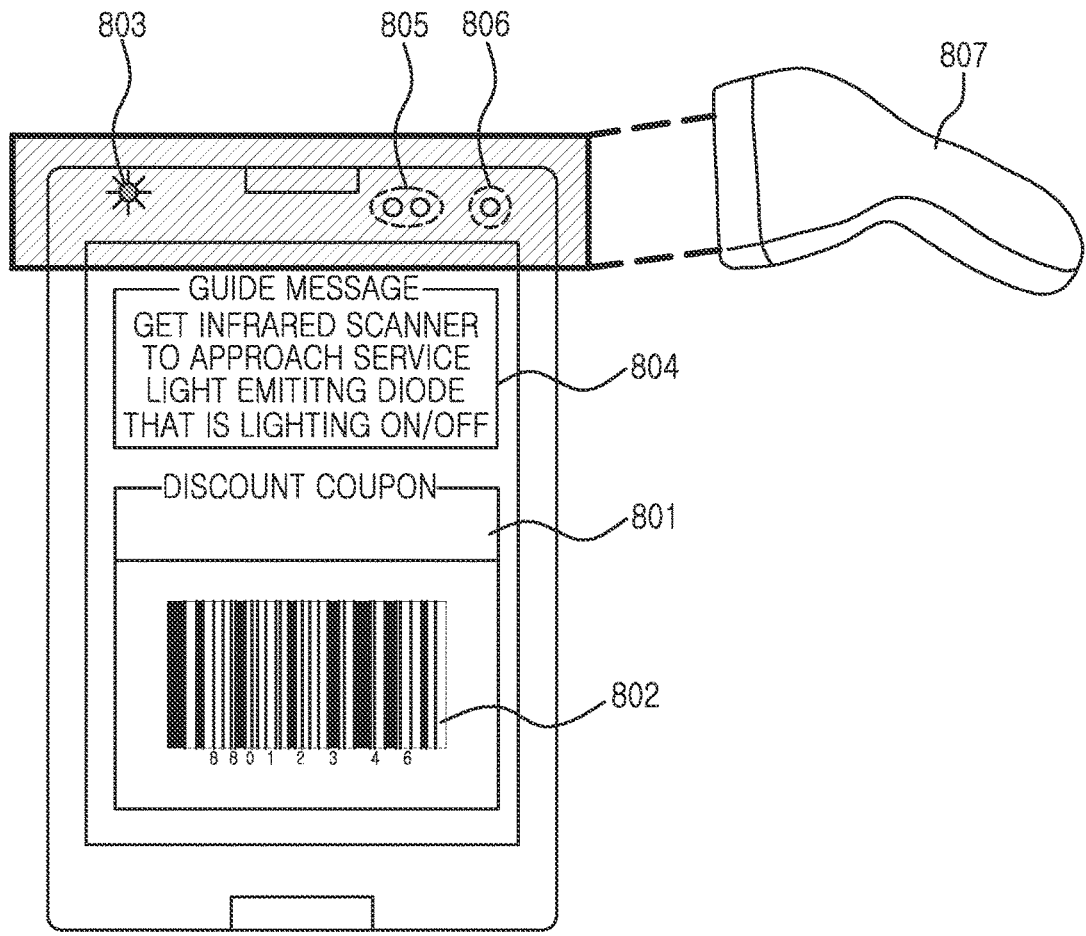
FIG. 8 is a diagram illustrating an operation method of an electronic device transmitting information on a barcode by using an infrared LED according to an exemplary embodiment of the present invention.

FIG. 8 is a diagram illustrating an operation method of an electronic device transmitting information on a barcode by using an infrared LED according to an exemplary embodiment of the present invention.

Referring to FIG. 8, the electronic device can display any content 801 including a barcode 802 on a touch screen of the electronic device. The barcode 802 including information of the content 801 can be displayed together with the content 801 displayed on the touch screen of the electronic device. A barcode can be comprised of at least eight codes. Digits marked under the barcode can be mainly subdivided into a country code, a manufacturer code, a self product code, a verification code, and the like. The country code can be comprised of three codes, the manufacturer code can be comprised of minimum three codes, and the self product code and the verification code can be comprised of minimum one code, respectively. For example, the barcode 802 illustrated in FIG. 8 is comprised of a total of eight codes and, among the eight codes, "880" denotes the country code, "123" denotes the manufacturer code, "4" denotes the self product code, and "6" denotes the verification code. Accordingly, the electronic device can display a barcode comprised of at least eight codes together with any content including the barcode, on the touch screen of the electronic device.

If the electronic device determines that the content 801 displayed on the touch screen of the electronic device includes the barcode 802, then the electronic device can transform the barcode 802 displayed on the touch screen into a binary code. The electronic device can recognize the barcode displayed on the touch screen and thereafter transform the recognized barcode in a form of a combination of at least eight digits of '0' or '1'. For example, among the barcode displayed on the touch screen of the electronic device, three country codes "880" can be transformed into binary codes of "101", respectively, and manufacturer codes "123" can be transformed into binary codes of "110", respectively. One self product code "4" can be transformed into a binary code of "1", and one verification code "6" can be transformed into a binary code of "0". Accordingly, because the barcode 802 can be comprised of at least eight codes, the electronic device can transform the barcode 802 capable of being comprised of the at least eight codes, in a form of a combination of at least eight digits of '0' or '1'.

After transforming the barcode 802 into the binary code, the electronic device can light ON/OFF a service LED 803. In detail, if the electronic device determines that the barcode 802 displayed on the touch screen of the electronic device has been transformed into the binary code, the electronic device can store the transformed binary code and thereafter light ON/OFF the service LED 803. The service LED 803 may correspond to a diode lighting ON/OFF when there is an operation of the electronic device or when the electronic device has an unchecked message and when content including a barcode are displayed on the touch screen of the electronic device. If the electronic device is being charged, then the service LED 803 provided in the electronic device can emit a 1st color when the charging is not completed. If the charging of the electronic device is completed, the service LED 803 can emit a 2nd color. When the electronic device has an unchecked message, the service LED 803 can light ON/OFF a 3rd color. If content including the barcode are displayed on the touch screen of the electronic device (e.g., if the electronic device determines that the content displayed on the touch screen includes the barcode), then the service LED 803 can light ON/OFF a 4th color.

For example, if the electronic device is being charged, then the electronic device can emit red when the electronic device is not completely charged. If the electronic device has been completely charged, then the electronic device can emit green. If the electronic device has an unchecked message, then the electronic device can light ON/OFF yellow. If the content including the barcode are displayed on the touch screen of the electronic device, then the electronic device can light ON/OFF blue.

The electronic device can light ON/OFF the service LED 803 and concurrently display a guide message 804 on the touch screen of the electronic device. For example, in order to lead a barcode reader 807 to approach an infrared LED 805, the electronic device can display the guide message 804 on the touch screen, together. According to exemplary embodiments of the present invention, the electronic device lights ON/OFF the service LED 803 in a set color to lead the barcode reader 807 to approach the infrared light emitting diode 805. The service LED 803 lights ON/OFF in order to lead the barcode reader 807 to scan the infrared LED 805 that is located on the same horizontal axis as the service LED 803. Because infrared rays lighted ON/OFF in the infrared LED 805 are invisible to the naked eye, the service LED 803 lights ON/OFF in a set color such that a user who uses the barcode reader 807 can scan the infrared LED 805 with the barcode reader 807.

A sensor 806 may be constructed to be isolated out of the infrared LED 805 or may be constructed to include the infrared LED 805. The sensor 806 can be a gesture sensor or a proximity sensor. The sensor 806 can determine whether the barcode reader 807 is located within a set distance. For example, the gesture sensor or the proximity sensor can determine whether the barcode reader 807 has approached within the set distance.

If the sensor 806 senses that the barcode reader 807 is located within the set distance, the electronic device can light ON/OFF the infrared LED 805 according to set order such that the barcode reader 807 can recognize the binary code. The infrared LED 805 can be defined as a device lighting ON/OFF infrared rays according to set order such that the barcode reader 807 can recognize the binary code transformed in the electronic device. In detail, the infrared LED 805 can light ON/OFF infrared rays according to arrangement order of binary codes detected in the electronic device. For example, if any one binary code detected in the electronic device is determined to correspond to a digit of '0', the infrared LED 805 can light OFF the infrared rays during a set time. If any one binary code detected in the electronic device is determined to be a digit of '1', the infrared LED 805 can light ON the infrared rays during the set time. For instance, assuming that the binary codes detected in the electronic device are equal to "10101010", the infrared LED 805 repeats a process of lighting ON and OFF the infrared rays four times during the set time. As another example, assuming that the binary codes detected in the electronic device are equal to "00101100", the infrared LED 805 repeats a process of lighting OFF, OFF, ON, OFF, ON, ON, OFF, and OFF the infrared rays during the set time.

According to the related art, an electronic device displays a barcode on a touch screen, and a barcode reader directly scans the barcode displayed on the touch screen of the electronic device. However, according to the related art, a barcode reader is not able to accurately recognize the barcode displayed in the electronic device because infrared rays generated in the barcode reader are diffusely reflected from an LCD screen of the electronic device. In contrast, according to exemplary embodiments of the present invention, the barcode 802 displayed on the touch screen may be transformed into the binary code and the electronic device may, according to a set order, light ON/OFF the infrared rays dependent on the binary code transformed in the infrared LED 805. Accordingly, the electronic device according to exemplary embodiments of the present invention provides a solution to the problems associated with electronic devices according to the related art in which the barcode reader cannot recognize the barcode displayed in the electronic device because the infrared rays generated in the barcode reader are diffusely reflected from the LCD screen of the electronic device. The electronic device according to exemplary embodiments of the present invention may remarkably reduce an erroneous recognition rate of the barcode reader relative to the electronic device according to the related art, by transforming the barcode 802 displayed in the electronic device into the binary code and lighting ON/OFF the infrared rays dependent on information on the barcode by means of the infrared LED 805.

Figure 9:
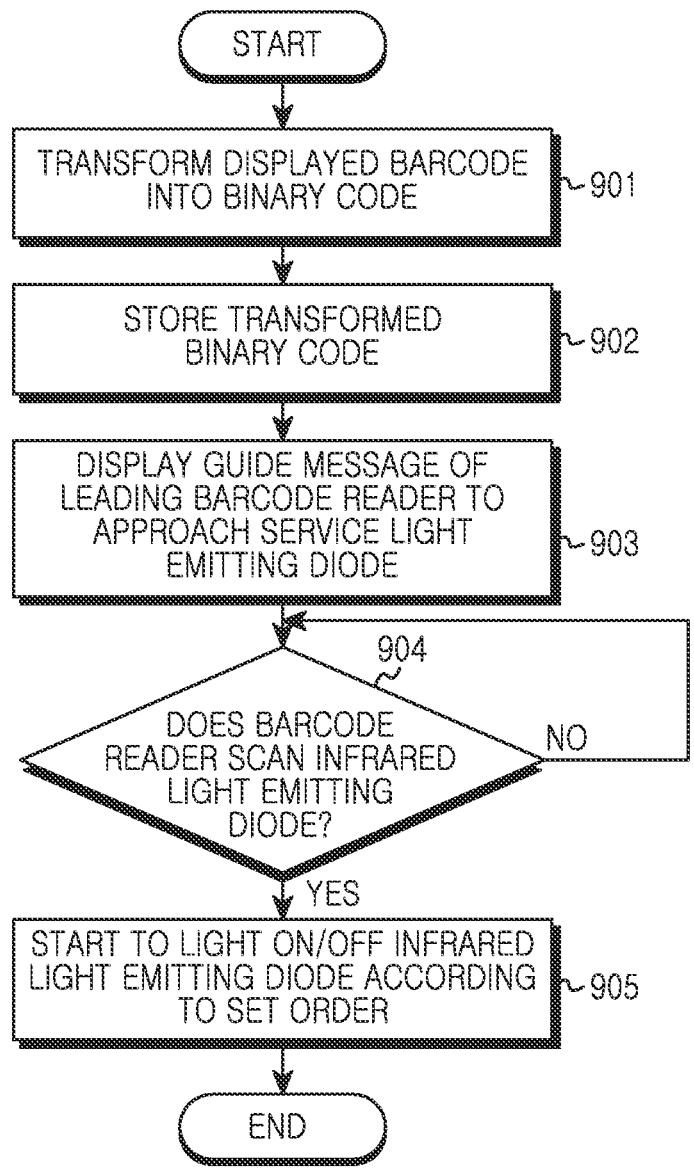
FIG. 9 is a flowchart illustrating an operation method of an electronic device according to an exemplary embodiment of the present invention.

FIG. 9 is a flowchart illustrating an operation method of an electronic device according to an exemplary embodiment of the present invention.

Referring to FIG. 9, in step 901, the electronic device transforms a displayed barcode into a binary code. The electronic device can display any content including a barcode on a touch screen. Further, the content displayed on the touch screen can be displayed together with the barcode including information of the corresponding content. The electronic device can recognize the barcode displayed on the touch screen and thereafter transform the recognized barcode in a form of a combination of at least eight digits of '0' or '1'. For example, assuming that the barcode displayed on the touch screen of the electronic device is given as "88012346", the electronic device can transform the barcode "88012346" into a binary code of "00111101".

After transforming the displayed barcode into the binary code in step 901, the electronic device proceeds to step 902 in which the electronic device stores the transformed binary code. The electronic device can transform the barcode displayed on the touch screen into the binary code and thereafter store the transformed binary code. For example, if the electronic device transforms the barcode of "88012346" into the binary code of "00111101", the electronic device can store the binary code of "00111101".

After storing the transformed binary code in step 902, the electronic device proceeds to step 903 in which the electronic device can display a guide message of leading a barcode reader to approach a service LED. In order to lead the barcode reader to approach an infrared LED, the electronic device can light ON/OFF the service LED and concurrently display the guide message on the touch screen together. For example, according to exemplary embodiments of the present invention, the electronic device lights ON/OFF the service LED in a set color to lead the barcode reader to approach the infrared LED. The service LED lights ON/OFF in order to lead the barcode reader to scan the infrared LED that is located on the same horizontal axis as the service LED. For example, because infrared rays lighted ON/OFF in the infrared LED are invisible to the naked eye, the service LED lights ON/OFF in a set color such that a user who uses the barcode reader can scan the infrared LED with the barcode reader.

In step 904, the electronic device determines whether the barcode reader is scanning the infrared LED. A sensor provided in the electronic device can determine whether the barcode reader is located within a set distance. For example, a gesture sensor or a proximity sensor can determine whether the barcode reader has approached the electronic device (e.g., the sensor, the service LED, and/or the infrared LED) within the set distance.

If the electronic device determines that the barcode reader is scanning the infrared LED in step 904, then the electronic device proceeds to step 905 in which the electronic device starts to light ON/OFF the infrared LED according to set order. In detail, the infrared LED provided in the electronic device can light ON/OFF infrared rays according to arrangement order of binary codes detected in the electronic device. For example, if any one binary code detected in the electronic device is determined to correspond to a digit of '0', the infrared LED can light OFF the infrared rays during a set time. If any one binary code detected in the electronic device is determined to correspond to a digit of '1', the infrared LED can light ON the infrared rays during the set time. For example, assuming that the binary codes detected in the electronic device are equal to "10101010", the infrared LED repeats a process of lighting ON and OFF the infrared rays four times during the set time. As another example, assuming that the binary codes detected in the electronic device are equal to "00101100", the infrared LED repeats a process of lighting OFF, OFF, ON, OFF, ON, ON, OFF, and OFF the infrared rays during the set time.

According to the related art, an electronic device displays a barcode on a touch screen, and a barcode reader directly scans the barcode displayed on the touch screen of the electronic device. However, according to the related art, the barcode reader is not able to accurately recognize the barcode displayed in the electronic device, because infrared rays generated in the barcode reader are diffusely reflected from an LCD screen of the electronic device. In contrast, according to exemplary embodiments of the present invention, the barcode displayed on the touch screen may be transformed (e.g., configured or converted) into the binary code and the electronic device may, according to set order, light ON/OFF the infrared rays dependent on the binary code transformed in the infrared LED. Accordingly, the electronic device according to exemplary embodiments of the present invention provides a solution to the problems associated with electronic device according to the related art in which the barcode reader cannot recognize the barcode displayed in the electronic device because the infrared rays generated in the barcode reader are diffusely reflected from the LCD screen of the electronic device. The electronic device according to exemplary embodiments of the present invention may remarkably reduce an erroneous recognition rate of the barcode reader relative to the electronic device according to the related art, by transforming the barcode displayed in the electronic device into the binary code and lighting ON/OFF the infrared rays dependent on information on the barcode by means of the infrared LED.

Figure 10:
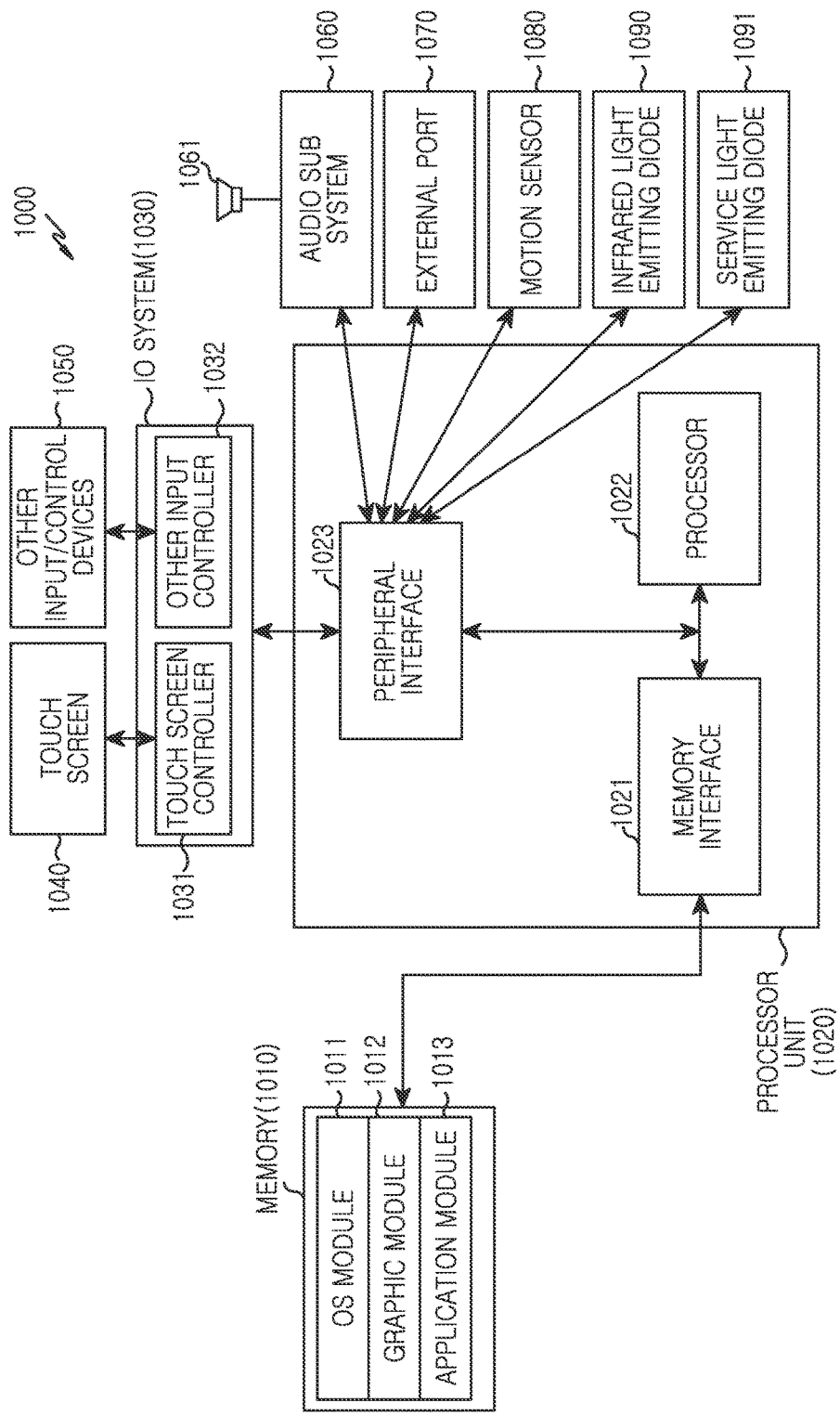
FIG. 10 is a block diagram illustrating a construction of an electronic device according to an exemplary embodiment of the present invention.

FIG. 10 is a block diagram illustrating a construction of an electronic device according to an exemplary embodiment of the present invention.

Referring to FIG. 10, the electronic device 1000 can be a portable electronic device, and can be a device such as a portable terminal, a mobile phone, a mobile pad, a media player, a tablet computer, a handheld computer, a laptop computer, a Personal Digital Assistant (PDA), a handheld e-reader, a handheld gaming console, and the like. The electronic device may be any portable electronic device including a device combining two or more functions among such devices.

The electronic device 1000 can include a memory 1010, a processor unit 1020, an Input Output (IO) system 1030, a touch screen 1040, other input control devices 1050, an audio sub system 1060, an external port 1070, and a motion sensor 1080.

The processor unit 1020 can include a memory interface 1021, at least one processor 1022, and a peripheral interface 1023. The processor unit 1020 (including the elements therein) may be collectively referred to as a processor. According to exemplary embodiments of the present invention, the processor unit 1020 detects binary codes in regular sequence according to arranged order of the binary codes. If any one binary code is determined to correspond to a digit of '0', the processor unit 1020 lights OFF an infrared LED during a set time. In addition, the processor unit 1020 detects the binary codes in regular sequence according to arranged order of the binary codes. If any one binary code is determined to correspond to a digit of '1', the processor unit 1020 lights ON the infrared LED during the set time.

The processor 1022 executes various software programs and performs various functions for the electronic device 1000. Further, the processor 1022 performs processing and control for voice communication and data communication. In addition to this general function, the processor 1022 executes a specific software module (i.e., an instruction set) stored in the memory 1010 and performs specific various functions corresponding to the software module. For example, the processor 1022 interworks with the software modules stored in the memory 1010 to perform a method of exemplary embodiments of the present invention.

The processor 1022 includes at least one data processor, at least one image processor, and/or at least one codec. The data processor, the image processor, and/or the codec may be constructed separately. In addition, the processor 1022 may include several processors performing different functions.

The peripheral interface 1023 connects to the IO system 1030 of the electronic device 1000 and to the memory 1010 through the memory interface 1021.

Various constituent elements of the electronic device 1000 can be coupled with one another by one or more communication buses (not denoted by reference numerals) or stream lines (not denoted by reference numerals).

The external port 1070 is used for directly connecting a portable electronic device (not shown) to other electronic devices or for indirect connecting the portable electronic device (not shown) to other electronic devices over a network (e.g., the Internet, an intranet, a Wireless Local Area Network (WLAN), and the like). For example, the external port 1070 may correspond to a Universal Serial Bus (USB) port, a FIREWIRE port, or the like.

The audio sub system 1060 can be coupled to a speaker 1061, and may control input and output of an audio stream such as voice recognition, voice replication, digital recording, and then like. The audio sub system 1060 may also control a telephony function. For example, the audio sub system 1060 communicates with a user through the speaker 1061. The audio sub system 1060 receives a data stream through the peripheral interface 1023 of the processor unit 1020, converts the received data stream into an electric stream, and forwards the converted electric stream (e.g., electric signal) to the speaker 1061. The speaker 1061 converts the electric stream into human-audible sound waves and outputs the converted sound waves. The audio sub system 1060 converts received electric streams into audio data streams, and transmits the converted audio data streams to the peripheral interface 1023. The audio sub system 1060 can include a detachable earphone, headphone, headset, and the like. The audio sub system 1060 may also be operatively connected to an earphone, a headphone, a headset, and the like via a wireless connection.

The motion sensor 1080 is coupled to the peripheral interface 1023 and enables various functions. For instance, the motion sensor 1080 can be coupled to the peripheral interface 1023 and may sense a motion of the electronic device 1000. In addition, a global positioning system and other sensors such as a temperature sensor, a biological sensor, and the like can be coupled to the peripheral interface 1023 and may perform related functions. According to exemplary embodiments of the present invention, the sensor determines whether a barcode reader is scanning the infrared LED, and determines whether the barcode reader is located within a set distance from the infrared LED and is scanning the infrared LED.

According to exemplary embodiments of the present invention, the infrared LED 1090 can light ON/OFF according to a set order such that the barcode reader can recognize a binary code transformed in the electronic device. For example, the infrared LED 1090 can light ON/OFF infrared rays according to an arrangement order of binary codes detected in the electronic device. For example, if any one binary code detected in the electronic device is determined to correspond to a digit of '0', the infrared LED 1090 can light OFF infrared rays during a set time. If any one binary code detected in the electronic device is determined to correspond to a digit of '1', the infrared LED 1090 can light ON the infrared rays during the set time.

The service LED 1091 may correspond to a diode lighting ON/OFF when there is an operation of the electronic device or when the electronic device has an unchecked message, and when content including a barcode are displayed on the touch screen of the electronic device. When the electronic device is being charged, if the charging is not completed, the service LED 1091 provided in the electronic device can emit a 1st color. After the charging of the electronic device is completed, the service LED 1091 can emit a 2nd color. When the electronic device has an unchecked message, the service LED 1091 can light ON/OFF a 3rd color. If the content being displayed on the touch screen of the electronic device is determined to include the barcode, the service LED 1091 can light ON/OFF a 4th color.

The IO system 1030 includes a touch screen controller 1031 and/or other input controller 1032. The touch screen controller 1031 can be coupled to the touch screen 1040. The touch screen 1040 and the touch screen controller 1031 can detect a contact and a motion or an interruption thereof by using, capacitive, resistive, infrared, surface acoustic wave technologies, and the like for determining one or more contact points with the touch screen 1040. The touch screen 1040 and the touch screen controller 1031 may also (or alternatively) use any multi-touch sensing technology including other proximity sensor arrays or other elements. The other input controller 1032 can be coupled to the other input/control devices 1050. The other input/control devices 1050 may include a button, a rocker switch, a thumb-wheel, a dial, a stick, a pointer device such as a stylus, and/or the like.

The touch screen 1040 provides an input/output interface between the electronic device 1000 and a user. For example, the touch screen 1040 forwards a user's touch input to the electronic device 1000. Also, the touch screen 1040 is a medium for showing an output of the electronic device 1000 to the user. For example, the touch screen 1040 shows a visual output to the user. This visual output can be presented in a form of a text, a graphic, a video, and a combination thereof.

The touch screen 1040 can use various displays. For example, the touch screen 1040 can use a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), and the like.

The memory 1010 can be coupled to the memory interface 1021. The memory 1010 may include a high-speed random access memory, a non-volatile memory such as magnetic disk storage devices, an optical storage device, a flash memory (e.g., a Not AND (NAND) memory, a Not OR (NOR) memory), and/or the like.

The memory 1010 stores software. A software constituent element includes an Operating System (OS) module 1011, a graphic module 1012, an application 1013, and the like. Because the module, the software constituent element, can be expressed as a set of instructions, the module may be referred to as an instruction set. The module may also be referred to as a program. According to exemplary embodiments of the present invention, the memory 1010 stores a transformed binary code.

The OS software 1011 (e.g., a built-in operating system such as WINDOWS, LINUX, Darwin, RTXC, UNIX, OS X, VxWorks, and the like) includes various software constituent elements controlling general system operation. As an example, control of the general system operation corresponds to memory management and control, storage hardware (device) control and management, power control and management, and the like. The OS software 1011 performs even a function of making smooth communication between various hardware (devices) and software constituent elements (modules).

The graphic module 1012 includes various software constituent elements for providing and displaying a graphic on the touch screen 1040. The term 'graphic' may refer to a text, a web page, an icon, a digital image, a video, an animation, and the like. According to exemplary embodiments of the present invention, the touch screen 1040 may display any content including a barcode, and may display a guide message of leading a barcode reader to approach a service LED.

The application module 1013 may include a browser, an electronic mail (e-mail) application, an instant message application, a word processing application, a keyboard emulation application, an address book application, a touch list, a widget, Digital Rights Management (DRM), a voice recognition application, a voice replication application, a position determining function, a location-based service, and the like. According to exemplary embodiments of the present invention, the application module 1013 transforms a displayed barcode into a binary code, and recognizes the displayed barcode and transforms the recognized barcode in a form of a combination of at least eight digits of '0' or '1'.

According to exemplary embodiments of the present invention, various functions of the electronic device 1000 can be executed by hardware including one or more stream processing and/or Application Specific Integrated Circuits (ASICs), and/or software, and/or a combination of them. For example, it will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

As described above, according to exemplary embodiments of the present invention, an electronic device and method for transmitting information on a barcode by using an infrared LED may increase a recognition rate of recognizing the information on the barcode in a barcode reader, by lighting ON/OFF an infrared LED according to a set order.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of an electronic device, the method comprising:
    displaying content including a barcode;
    transforming the barcode into a binary code;
    lighting ON/OFF a service light emitting diode (LED) in order to lead a barcode reader to approach an infrared LED and concurrently displaying a guide message of leading the barcode reader to approach the infrared LED; and
    lighting ON/OFF the infrared LED according to a set order based on the binary code,
    wherein the infrared LED is installed on a front surface of the electronic device.

2. The method of claim 1, wherein the transforming of the barcode into the binary code comprises:
    recognizing an image displayed on the display of the electronic device as the barcode; and
    transforming the barcode into the binary code having a combination of at least eight digits of '0' or '1'.

3. The method of claim 1, further comprising storing the binary code.

4. The method of claim 1, wherein the lighting ON/OFF of the infrared LED according to the set order based on the binary code comprises:
    starting to light ON/OFF an infrared LED;
    determining whether the barcode reader is scanning the infrared LED; and
    starting to light ON/OFF the infrared LED based on a result of the determination.

5. The method of claim 4, wherein the determining of whether the barcode reader is scanning the infrared LED comprises determining whether the barcode reader is positioned to scan the infrared LED.

6. The method of claim 4, wherein the determining of whether the barcode reader is scanning the infrared LED comprises determining whether the barcode reader is scanning the infrared LED by using a sensor located within a set distance from the infrared LED.

7. The method of claim 6, wherein the sensor comprises at least one of a gesture sensor and a proximity sensor.

8. The method of claim 4, wherein the starting to light ON/OFF the infrared LED comprises:
    detecting binary code elements corresponding to the binary code in regular sequence according to arranged order of the binary code; and
    if the detected any one binary code element is determined to correspond to a digit of '0', lighting OFF the infrared LED during a corresponding set time.

9. The method of claim 4, wherein the starting to light ON/OFF the infrared LED comprises:
    detecting binary code elements corresponding to the binary code in regular sequence according to arranged order of the binary code; and
    if any one binary code element is determined to correspond to a digit of '1', lighting ON the infrared LED during a corresponding set time.

10. A non-transitory computer readable storage medium storing instructions that, when executed, cause at least one processor to perform the method of claim 1.

11. An electronic device comprising:
    a display;
    a service Light Emitting Diode (LED);
    an infrared LED; and
    an application module configured to:
        control the display to display content including a barcode,
        transform the barcode into a binary code,
        control the service LED to light ON/OFF the service LED in order to lead a barcode reader to approach the infrared LED and control the display to concurrently display a guide message of leading the barcode reader to approach the infrared LED; and
        control the infrared LED to light ON/OFF according to a set order based on the binary code,
    wherein the infrared LED is installed on a front surface of the electronic device.

12. The device of claim 11, wherein the application module is further configured to:
    recognize an image displayed on the display of the electronic device as the barcode, and
    transform the recognized barcode into the binary code having a combination of at least eight digits of '0' or '1'.

13. The device of claim 11, further comprising a memory for storing the binary code.

14. The device of claim 11, wherein the application module is further configured to:
    determine whether the barcode reader is scanning the infrared LED, and
    control the infrared LED to light ON/OFF based on a result of the determination.

15. The device of claim 14, wherein the determining of whether the barcode reader is scanning the infrared LED comprises determining whether the barcode reader is positioned to scan the infrared LED.

16. The device of claim 14, wherein the sensor is further configured to determine whether the barcode reader is located within a set distance from the infrared LED and whether the barcode reader is scanning the infrared LED using one or more sensors installed on the front surface of the electronic device.

17. The device of claim 16, wherein the one or more sensor comprises at least one of a gesture sensor and a proximity sensor.

* * * * *